(12) United States Patent
Youn (10) Patent No.: US 9,882,527 B2
(45) Date of Patent: Jan. 30, 2018

(54) DE-ICING SOLAR PANEL

(71) Applicant: SOLASIDO KOREA CO., LTD., Jeonju-si, Jeollabuk-do (KR)

(72) Inventor: Chang-Bok Youn, Jeonju-si (KR)

(73) Assignee: SOLASIDO KOREA CO., LTD., Jeonju-si (KR)

(*) Notice: Subject to any disclaimer, the term of this patent is extended or adjusted under 35 U.S.C. 154(b) by 152 days.

(21) Appl. No.: 14/724,760

(22) Filed: May 28, 2015

(65) Prior Publication Data

US 2015/0263669 A1 Sep. 17, 2015

Related U.S. Application Data

(63) Continuation of application No. PCT/KR2014/005189, filed on Jun. 13, 2014.

(30) Foreign Application Priority Data

Oct. 2, 2013 (KR) .................. 10-2013-0118147
Apr. 30, 2014 (KR) .................. 10-2014-0052134

(51) Int. Cl.
| | |
|---|---|
| *H02J 7/00* | (2006.01) |
| *H02S 40/38* | (2014.01) |
| *H02S 40/12* | (2014.01) |
| *H02S 40/42* | (2014.01) |
| *H02S 20/32* | (2014.01) |
| *H02S 20/23* | (2014.01) |
| *H02S 20/30* | (2014.01) |
| *H02S 30/10* | (2014.01) |
| *H02S 40/44* | (2014.01) |
| *H02J 7/35* | (2006.01) |
| *F24J 2/46* | (2006.01) |
| *F24J 2/52* | (2006.01) |
| *F24J 2/54* | (2006.01) |

(52) U.S. Cl.
CPC ............. *H02S 40/38* (2014.12); *F24J 2/461* (2013.01); *F24J 2/5233* (2013.01); *F24J 2/541* (2013.01); *H02J 7/35* (2013.01); *H02S 20/23* (2014.12); *H02S 20/30* (2014.12); *H02S 20/32* (2014.12); *H02S 30/10* (2014.12); *H02S 40/12* (2014.12); *H02S 40/42* (2014.12); *H02S 40/44* (2014.12); *F24J 2002/5465* (2013.01); *Y02B 10/20* (2013.01); *Y02E 10/47* (2013.01)

(58) Field of Classification Search
CPC . H02J 7/35; H02J 7/355; Y02E 60/12; H01M 10/465; H01M 16/006
USPC ............................................. 320/101
See application file for complete search history.

(56) References Cited

U.S. PATENT DOCUMENTS

| | | | | |
|---|---|---|---|---|
| 5,887,584 | A * | 3/1999 | Smith | E04D 13/103 126/569 |
| 2006/0118162 | A1* | 6/2006 | Saelzer | B60L 8/00 136/246 |
| 2007/0023078 | A1* | 2/2007 | Palladino | H01L 31/042 136/244 |
| 2009/0038673 | A1* | 2/2009 | Ware | H02S 10/40 136/246 |
| 2011/0094558 | A1* | 4/2011 | Choi | A01G 9/243 136/244 |
| 2013/0255665 | A1* | 10/2013 | Nickel | F24J 2/461 126/595 |
| 2015/0001201 | A1* | 1/2015 | Adler | F24J 2/461 219/213 |

FOREIGN PATENT DOCUMENTS

| | | |
|---|---|---|
| KR | 20000051996 A | 8/2000 |
| KR | 100807511 B1 | 2/2008 |
| KR | 1020100112039 A | 10/2010 |
| KR | 1020100131201 A | 12/2010 |
| KR | 1020110052450 A | 5/2011 |
| KR | 1020120137939 A | 12/2012 |

OTHER PUBLICATIONS

International Search Report for PCT/KR2014/005189 dated Dec. 8, 2014, citing the above reference(s).

* cited by examiner

*Primary Examiner* — Arun Williams
(74) *Attorney, Agent, or Firm* — Hauptman Ham, LLP (57) ABSTRACT

A solar thermal collector is disclosed. The solar thermal collector has side surfaces and a bottom supported by a support frame shaped into a square shifter and installed tilted on a rooftop of a building by means of a plurality of angle connections. The solar thermal collector includes a reverse bias circuit. The top of a lower surface of the support frame is level with a tilted surface of the solar thermal collector or the support frame includes a tilted surface tiled downward, which is formed along a horizontal direction, lower than the surface of the solar thermal collector.

4 Claims, 7 Drawing Sheets

DE-ICING SOLAR PANEL

CROSS REFERENCE TO RELATED APPLICATION

This application is a continuation application of International Application No. PCT/KR2014/005189, filed on Jun. 13, 2014, which claims the benefit of Korean Patent Application No. 10-2013-0118147, filed on Oct. 2, 2013 and 10-2014-0052134, filed on Apr. 30, 2014, which is hereby incorporated by reference as if fully set forth herein.

BACKGROUND OF THE INVENTION

Field of the Invention

The present invention relates generally to a solar thermal collector having a snow melting function and a heat radiation function, and more particularly, to a solar thermal collector having a snow melting function, which is so configured as to melt down snow through heating of solar cells in winter by converting the solar energy of incident sunlight to electrical energy and supplying the resulting charged electricity reversely to each solar cell of the solar thermal collector, while encouraging snow accumulated on the solar cell to slip off smoothly on a tilted surface of the solar thermal collector without lingering on a step of a support frame. Further, the present invention relates to a solar thermal collector having a heat radiation function, which can increase the efficiency of electric power generation by overcoming a problem in electric power generation efficiency caused by solar heat and radiation heat generated from the solar thermal collector in summer.

Discussion of the Related Art

A solar thermal collector is a solar cell that generates electric power by converting the solar energy of incident sunlight directly to electric energy. In general, the solar thermal collector is fabricated in the form of a plate. A plurality of solar thermal collectors are combined successively in length and width directions and installed on the rooftop of a building by setting up a plurality of angle connections.

Figure 1:
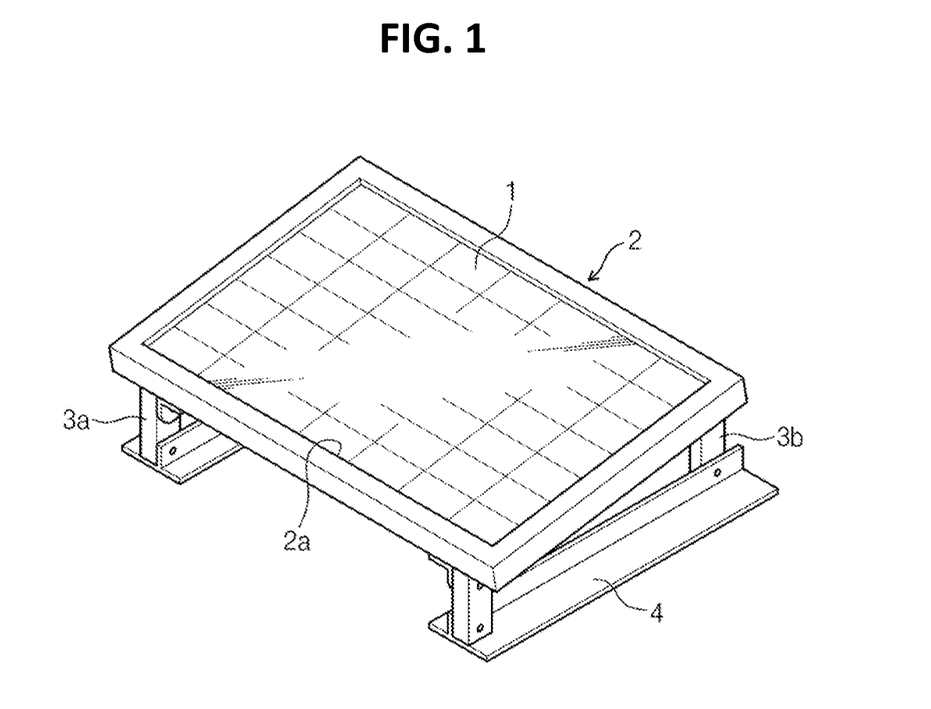
FIG. 1 is a diagram illustrating a conventional solar thermal collector.

FIG. 1 illustrates a conventional solar thermal collector. Referring to FIG. 1, a solar thermal collector 1 is supported by a support frame 2 shaped into a square shifter. The support frame 2 is installed tilted on front lower frames 3a and rear lower frames 3b that are configured into vertical angle connections, at a predetermined height above the floor. The bottoms of the front and rear lower frames 3a and 3b are connected and fixed by means of horizontal frame bases 4.

Figure 2:
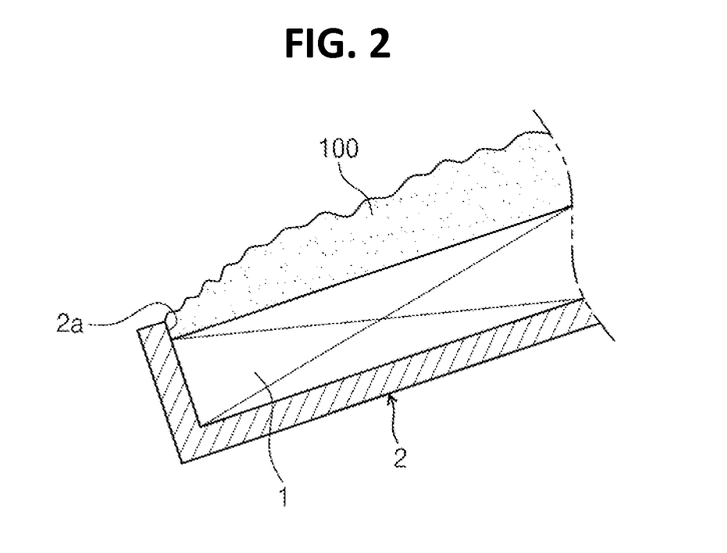
FIG. 2 is a sectional enlarged view of a part of the conventional solar thermal collector illustrated in FIG. 1.

In winter, snowfall on a solar thermal collector blocks out sunshine and thus the solar thermal collector stops generating electric power. The conventional solar thermal collector 1 does not work well because snow 100 lingers and then accumulates over a step 2a defined by the support frame 2 without flowing down the surface of the solar thermal collector 1. Moreover, although the solar thermal collector 1 generates electric power in summer, high atmospheric temperature and much radiation heat decrease the power generation efficiency of the solar thermal collector 1 in relation to temperature.

Cited references include Korea Registered Patent Publication No. 10-0807511 (entitled by Solar Heat Absorber Using Binder or Welding Union Type of Heat Absorbent Plate and One Pipe) and Korea Laid-Open Patent Publication No. 2000-0051996 (entitled by Integral Plate Type Absorber Plate of Flat Plate Solar Collector and Manufacturing Method of It).

SUMMARY OF THE INVENTION

Accordingly, the present invention is directed to a solar thermal collector that substantially obviates one or more problems due to limitations and disadvantages of the related art.

An object of the present invention is to provide a solar thermal collector having a snow melting function, which is so configured as to melt down snow through heating of solar cells in winter by converting the solar energy of incident sunlight to electrical energy and supplying the resulting charged electric power reversely to each solar cell of the solar thermal collector, while encouraging snow accumulated on the solar cell to slip off smoothly on a tilted surface of the solar thermal collector without lingering on a step of a support frame.

Another object of the present invention is to provide a solar thermal collector having a heat radiation function by use of a carbon nanofiber to increase power generation efficiency, in consideration of decreased power generation efficiency due to heat generated from the solar thermal collector in summer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a solar thermal collector, which has side surfaces and a bottom supported by a support frame shaped into a square shifter and is installed tilted on a rooftop of a building by means of a plurality of angle connections, includes a reverse bias circuit. The top of a lower surface of the support frame is level with a tilted surface of the solar thermal collector or the support frame includes a tilted surface tiled downward, which is formed along a horizontal direction, lower than the surface of the solar thermal collector.

In another aspect of the present invention, a solar thermal collector having a heat radiation function includes a heat radiation layer formed of a heat radiation material on a rear surface of the solar thermal collector.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Preferred embodiments of a solar thermal collector according to the present invention will be described in detail with reference to the accompanying drawings.

Figure 3:
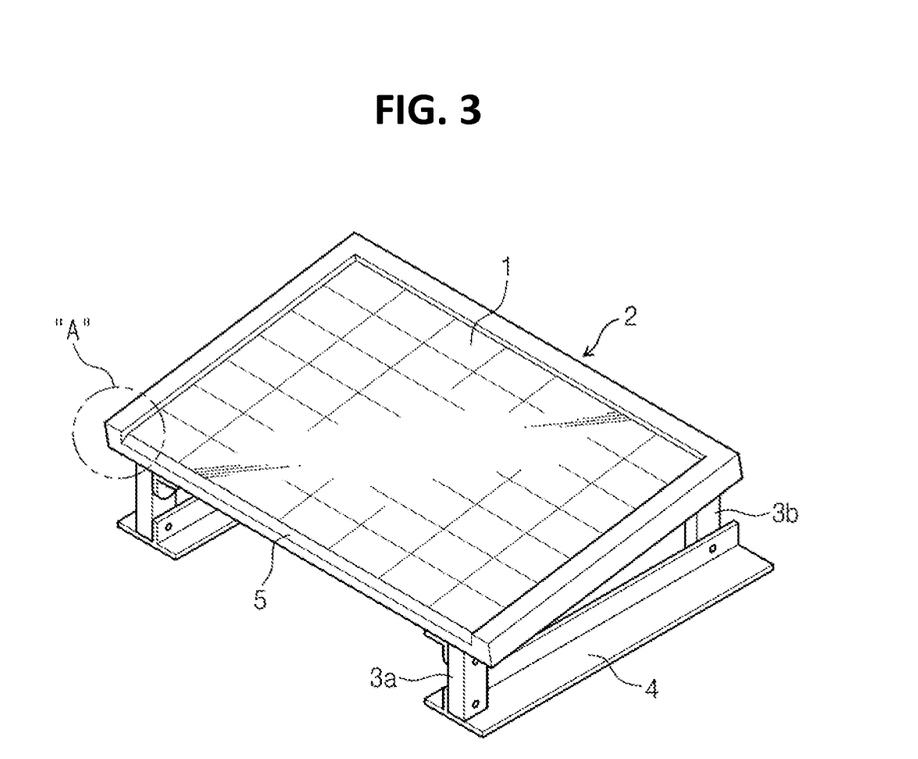
FIG. 3 is a perspective view of a solar thermal collector according to an embodiment of the present invention.

FIG. 3 is a perspective view of a solar thermal collector according to an embodiment of the present invention. Referring to FIG. 3, the solar thermal collector 1 is fixed inside the support frame 2 shaped into a square shifter. The support frame 2 is installed tilted on the front lower frames 3a and the rear lower frames 3b that are configured into vertical angle connections, at a predetermined height above the floor. The bottoms of the front and rear lower frames 3a and 3b are connected and fixed by means of the horizontal frame bases 4.

Figure 4:
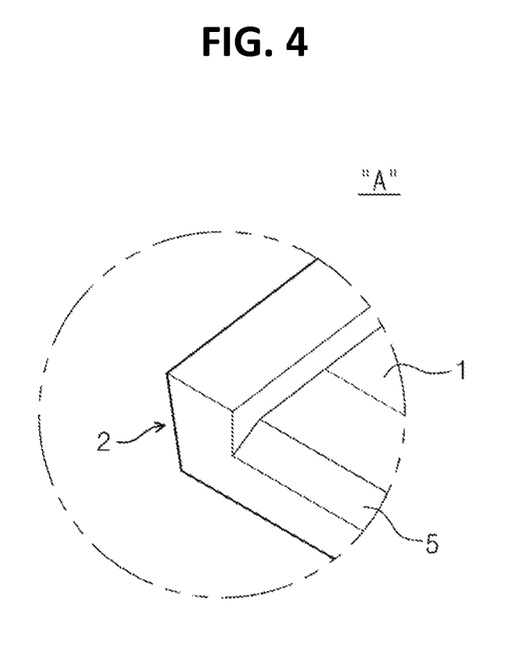
FIG. 4 is an enlarged view of a part "A" illustrated in FIG. 3.

According to the present invention, the top of a lower surface of the support frame 2 is level with the titled surface of the solar thermal collector 1. Or a tilted surface 5 tilted downward is formed along a horizontal length, lower than the surface of the solar thermal collector 1, as illustrated in FIG. 4. The solar thermal collector 1 is configured to include a reverse bias circuit. Accordingly, in the case of snowfall on the surface of the solar thermal collector 1, there is no obstacle to flow-down of the snow on the surface of the solar thermal collector 1 and thus the snow actively slips off the surface of the solar thermal collector 1.

Figure 6:
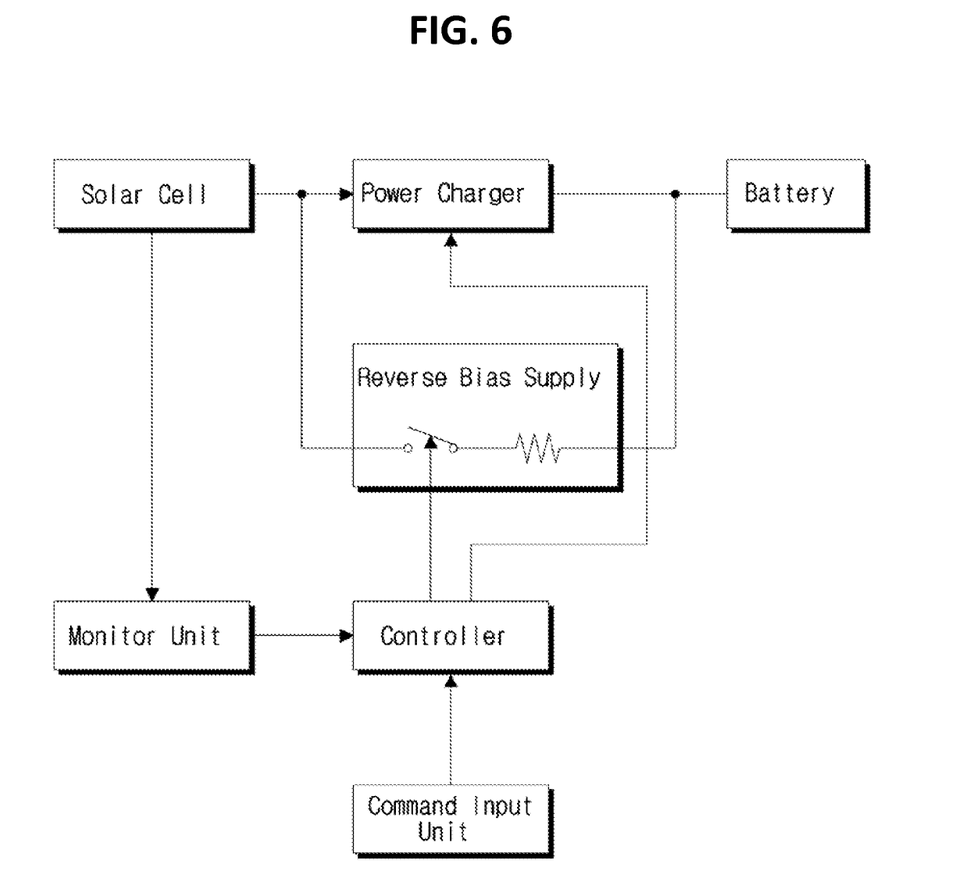
FIG. 6 is a block diagram of a reverse bias circuit applied to a solar thermal collector according to an embodiment of the present invention.

Further, the reverse bias circuit of the solar thermal collector 1 melts down snow through heating of solar cells by converting the solar energy of incident sunlight to electrical energy and reversely supplying the resulting charged electric power to each solar cell of the solar thermal collector 1. As illustrated in FIG. 6, the reverse bias circuit includes a power charger for charging a battery by converting solar energy received from solar cells to electrical energy, a reverse bias supply for, when the power charger stops its operation under the control of a controller, applying current of the battery to the solar cells according to an operation command received from the controller, the controller for controlling an operation of the power charger and a reverse bias operation, a command input unit for commanding snow melting by the controller, and a monitor unit connected between the controller and the solar cells, to enable information about generated power of the solar cells to be viewed.

The reverse bias circuit having the above-described configuration prevents a reverse bias voltage from doing damage to a solar cell due to current limitation incurred by resistance. When a snow-melting switch is turned off, a switch of the reverse bias supply is also turned off, thus operating the power charger. The monitor unit includes a generated power monitor and a Closed Circuit Television (CCTV) monitor. An operator may view whether snow is accumulated on the CCTV monitor. If snow is accumulated, the operator turns on the snow-melting switch of the command input unit and thus the controller controls the power charger to stop its operation and controls the reverse bias supply to turn on the switch. Thus, a battery voltage transfers current to a solar cell through a resistor and a switch of the reverse bias supply, thereby melting away the snow accumulated on the solar thermal collector. The use of this reverse bias circuit advantageously simplifies the device and reduces cost, thereby leading to economic effectiveness.

If the solar thermal collector 1 of the present invention is mounted at a large tilting angle, the reverse bias circuit may fast remove melted snow, together with the tilted surface 5. Although the angle of the solar thermal collector 1 may be adjusted in many manners, the angle adjustment is performed by an angle controller 6 illustrated in FIG. 5 according to the present invention. That is, the angle controller 6 is realized by engaging a front lower part of the solar thermal collector 1 on the front lower frames 3a by means of hinge shafts H so that the front lower part of the solar thermal collector 1 may rotate up and down, and making a rear lower part of the solar thermal collector 1 movable up and down by a driving force of a motor 65.

Figure 5:
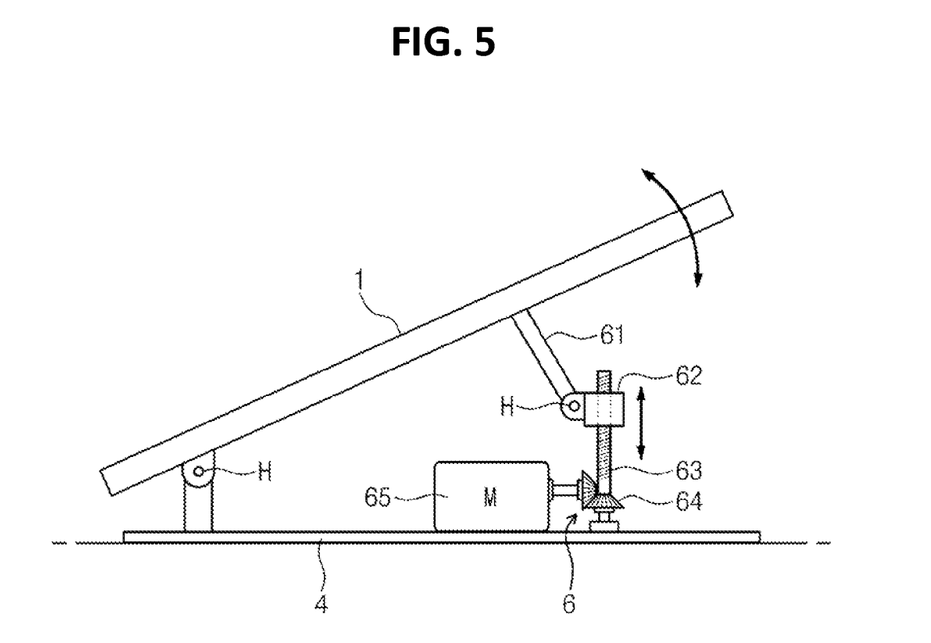
FIG. 5 is a side view of a solar thermal collector according to another embodiment of the present invention.

To be more specific, a lift bar 61 is formed under the rear lower part of the solar thermal collector 1, and one end of the lift bar 61 is connected to one portion of a slider 62 by means of a hinge shaft H. The slider 62 is spirally engaged with a vertical transfer shaft 63 and the transfer shaft 63 is rotated by receiving a force from the motor 65 through a bevel gear 64. Thus, the slider 62 may move up and down along the transfer shaft 63.

As described above, the top of the lower surface of the support frame 2 is level with the titled surface of the solar thermal collector 1. Or the tilted surface 5 tilted downward 1 is formed along the horizontal length, lower than the surface of the solar thermal collector 1, as illustrated in FIG. 4. As the solar thermal collector 1 is configured to include the reverse bias circuit, snow accumulated on the solar thermal collector 1 may actively slip down along the titled surface of the solar thermal collector 1, and the snow is also melted down through heating of solar cells by converting the solar energy of incident sunlight to electrical energy and reversely supplying the resulting charged electric power to the solar cells. As a consequence, the accumulated snow can be removed fast, efficiently, and easily and thus malfunction of the solar thermal collector caused by snowfall in winter can be prevented.

Figure 7:
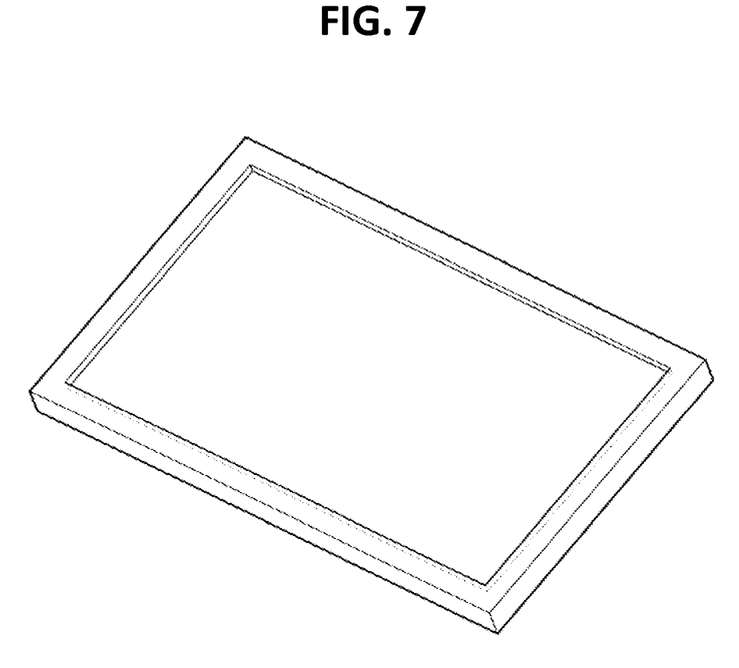
FIG. 7 is a diagram illustrating an implementation example of a solar thermal collector having a heat radiation function according to an embodiment of the present invention.

FIG. 7 is a diagram illustrating an implementation example of a solar thermal collector 100 having a heat radiation function according to another embodiment of the present invention. Referring to FIG. 7, the solar thermal collector 100 of the present invention further includes a heat radiation layer containing a heat radiation material on the rear surface of the solar thermal collector 100, so that the solar thermal collector 100 may have the heat radiation function.

The heat radiation material may be a Carbon Nano Tube (CNT) and the heat radiation layer may be formed by directly printing the CNT on the rear surface of the solar thermal collector 100 in a printing scheme. Or the heat radiation layer may be formed by attaching a CNT sheet onto the rear surface of the solar thermal collector 100.

Specifically, a CNT having an excellent heat radiation effect and low fabrication cost is used to facilitate heat radiation of the solar thermal collector 100 according to the present invention. Particularly, graphene or olefin may be used. Graphene and olefin are materials having an excellent heat radiation effect due to their high electrical conductivity and heat conductivity and their high strength.

Therefore, the solar thermal collector 100 having a heat radiation function may be formed by printing or spray-depositing a CNT such as graphene or olefin or attaching a CNT sheet such as a graphene or olefin sheet onto the rear surface of the solar thermal collector 100. As a consequence, the solar thermal collector 100 generates solar power, directed toward the sun, while the CNT having the heat radiation function on the rear surface of the solar thermal collector 100 naturally radiates heat in a shadowing area, thus decreasing the temperature of the solar thermal collector 100.

The CNT used in the present invention is characterized by high strength, low electrical resistivity, and high heat conductivity. Although a multi-wall CNT has a lower density than aluminum, it has a tensile strength larger than A36 steel by about 370 times. Further, the multi-wall CNT is similar to copper and diamond in heat conductivity. Thus, the multi-wall CNT may be used for a strong electric conductor and as a heat radiation material. The CNT is a carbon crystal having a one-dimensional structure. Graphene is a two-dimensional carbon crystal having excellent physical and chemical properties.

Graphene may be said to be a basic structure of a CNT and fullerene as well as graphite. That is, graphite is formed by stacking graphene layers, CNT is a graphite sheet rolled into a cylindrical shape, and fullerene is a graphene sphere like a soccer ball. Graphene is the thinnest two-dimensional (planar) material of existing discovered materials. Graphene has high electrical conductivity, heat conductivity, and strength. Since graphene is a planar sheet of carbon atoms densely packed into a honeycomb crystal lattice, it is a very thin carbon sheet having a thickness of 0.34 nm (1 nm=$10^{-9}$ m), which is excellent in flexibility and light transmission.

Further, because graphene can transfer heat very well by strong double carbon-carbon bonds, it has heat conductivity equal to or higher than that of diamond and a mechanical strength larger than steel by 200 times.

As is apparent from the foregoing description of the solar thermal collector according to the present invention, snow accumulated on the solar thermal collector may actively slip down along the titled surface of the solar thermal collector, and the snow is also melted down through heating of solar cells by converting the solar energy of incident sunlight to electrical energy and reversely supplying the resulting charged electric power to the solar cells. As a consequence, the accumulated snow can be removed fast, efficiently, and easily and thus malfunction of the solar thermal collector caused by snowfall in winter can be prevented. Further, since the power generation efficiency of the solar thermal collector is decreased due to heat generated from the solar thermal collector in summer, a heat radiation function is added to the solar thermal collector by use of a carbon nanofiber. Therefore, the power generation efficiency of the solar thermal collector can be increased.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A solar thermal collector having side surfaces and a bottom supported by a support frame shaped into a square shifter and installed tilted on a rooftop of a building by means of a plurality of angle connections, the solar thermal collector comprising:
 a reverse bias circuit;
 an angle controller configured to control a tilting angle of the solar thermal collector,
 wherein the top of a lower surface of the support frame is level with a tilted surface of the solar thermal collector or the support frame includes a tilted surface tiled downward, which is formed along a horizontal direction, lower than the surface of the solar thermal collector, and
 wherein the angle controller comprises;
  a hinge shaft configured to engage a front lower part of the solar thermal collector on a front lower frame to enable the front lower part of the solar part to rotate up and down,
  a slider having one portion connected to a lift bar formed under a rear part of the solar thermal collector by a hinge shaft,
  a vertical transfer shaft spirally engaged with the slider, and
  a bevel gear configured to transfer a force of a motor to the vertical transfer shaft.

2. The solar thermal collector according to claim 1, wherein the reverse bias circuit comprises:
 a power charger configured to charge a battery by converting solar energy received from a solar cell to electrical energy;
 a reverse bias supply configured to, when the power charger is inoperative under the control of a controller, applying current of the battery to the solar cell according to an operation command received from the controller; the controller configured to control an operation of the power charger and a reverse bias operation; a command input unit configured to command snow melting by the controller; and a monitor unit connected between the controller and the solar cells, configured to enable information about generated power of the solar cell to be viewed.

3. A solar thermal collector having a heat radiation function, the solar thermal collector comprising:
 a heat radiation layer formed of a heat radiation material on a rear surface of the solar thermal collector,
 wherein the heat radiation material is a Carbon Nano Tube (CNT), and
 wherein the heat radiation layer is formed by directly printing the CNT on the rear surface of the solar thermal collector in a printing scheme.

4. A solar thermal collector having a heat radiation function, the solar thermal collector comprising:
 a heat radiation layer formed of a heat radiation material on a rear surface of the solar thermal collector,
 wherein the heat radiation material is a Carbon Nano Tube (CNT), and
 wherein the heat radiation layer formed of the CNT is attached onto the rear surface of the solar thermal collector.

* * * * *